(12) United States Patent
Battle et al.

(10) Patent No.: US 6,453,330 B1
(45) Date of Patent: Sep. 17, 2002

(54) HIGH-PRECISION BILINEAR INTERPOLATION

(75) Inventors: James T. Battle, San Jose; William N. Ng, Sunnyvale, both of CA (US)

(73) Assignee: ATI International SRL, Barbados (KN)

( * ) Notice: Subject to any disclaimer, the term of this patent is extended or adjusted under 35 U.S.C. 154(b) by 0 days.

(21) Appl. No.: 09/449,012

(22) Filed: Nov. 24, 1999

(51) Int. Cl.$^7$ ................................................ G06F 17/17
(52) U.S. Cl. ...................................... 708/290; 345/523
(58) Field of Search .......................... 708/290; 345/428, 345/523

(56) References Cited

U.S. PATENT DOCUMENTS 5,801,678 A * 9/1998 Huang et al. ............... 708/290
6,219,464 B1 * 4/2001 Greggain et al. ........... 708/290
6,348,921 B1 * 2/2002 Zhao et al. .................. 345/428
6,373,495 B1 * 4/2002 Lin et al. ..................... 345/428

* cited by examiner

Primary Examiner—David H. Malzahn
(74) Attorney, Agent, or Firm—Vedder, Price, Kaufman & Kammholz (57) ABSTRACT

A circuit is provided for performing a high-precision bilinear interpolation operation. The circuit includes a first interpolation operator for interpolating two operands representing a pair of texels using a weight high component of a weighting value. The first interpolation operator outputs a first result. A second interpolation operator interpolates the two operands representing the pair of texels using a weight low component of the weighting value. The second interpolation operator outputs a second result. A combination operator, coupled to the first and second interpolation operators, combines the first and second results to form a value of higher precision than that yielded by typical circuit implementations for bilinear interpolation operation.

8 Claims, 6 Drawing Sheets

HIGH-PRECISION BILINEAR INTERPOLATION

TECHNICAL FIELD OF THE INVENTION

This invention relates generally to the field of computer graphics, and more particularly, to high-precision bilinear interpolation.

BACKGROUND OF THE INVENTION

Many applications of modern computer graphics strive to create three-dimensional images on a display device (e.g., a computer monitor) in order to provide a realistic virtual environment. In a typical imaging technique, a three-dimensional object is created by connecting a number of two-dimensional polygons, such as, for example, triangles. Each polygon defines a surface which can be assigned or given a texture, such as wood, stone, fur, hair, scales, and the like, to enhance the realism of the generated object.

Because an object may appear at different perceived distances (e.g., very near, near, far, or very far) during an imaging sequence, a single version of a texture generally cannot be used for all situations. For example, a version of a wood texture which is appropriate for a close-up view of a tree would not be appropriate for a far-away view of the same tree.

Accordingly, for any given texture, a number of multim in parvum (MIP) maps may be provided. Each texture MIP map corresponds to a particular value for level of detail (LOD), which defines how far away a particular object is perceived to be from the viewer of a display. For example, one MIP map may be provided for an object when it should be perceived as being relatively close to a viewer, whereas another MIP map may provided for the same object when it should be perceived as being relatively far from the viewer.

When an object onto which a texture is to be applied does not have the same LOD value as any given MIP map, interpolation can be performed between two MIP maps in order to afford a suitable texture map for that LOD value. When interpolating, it is desirable to provide a high degree of precision so that the displayed image is made to appear as realistic as possible.

SUMMARY OF THE INVENTION

The present invention provides a high-precision bilinear interpolation circuit which provides additional detail for an array of texture elements or "texels" forming at least a portion of a texture map. Each texel has a color or gray scale value. A number of weighting values--each comprising a "weight high" component and a "weight low" component—each define the amount of weight to be given to the color or gray scale value for adjacent texels in an interpolation operation. The present invention provides a circuit which may operate on both components of the weighting values during interpolation utilizing many of the elements typically available in a previously developed circuit for performing trilinear interpolation. The present invention thereby provides greater detail, without a significant increase in area.

According to an embodiment of the present invention, a circuit is provided for performing a high-precision bilinear interpolation operation. The circuit includes a first interpolation operator for interpolating two operands representing a pair of texels using a weight high component of a weighting value. The first interpolation operator outputs a first result. A second interpolation operator interpolates the two operands representing the pair of texels using a weight low component of the weighting value. The second interpolation operator outputs a second result. A combination operator, coupled to the first and second interpolation operators, combines the first and second results.

A technical advantage of the present invention includes forming a high-precision bilinear interpolation circuit using standard hardware elements readily available for implementing a typical trilinear interpolation circuit. Such hardware elements include a plurality of interpolation operators, which are organized as pairs. In accordance with the present invention, for each pair, one interpolation operator operates on the weight high component of a weighting value and the other interpolation operator operates on the weight low component of the weighting value, as explained herein. To the standard hardware elements are added a number of combination operators, each of which is operable to combine the results output by a respective pair of interpolation operators. This affords more detail in a bilinear interpolation operation without significantly increasing the area required for implementation in an integrated circuit (IC) device. In particular, compared to a straightforward method of adding a substantial number of interpolation operators in order to provide more detail, the present invention can provide as much detail without the corresponding cost in surface area in a semiconductor chip implementation. Other aspects and advantages of the present invention are readily apparent to one skilled in the art from the following figures, descriptions, and claims.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION OF THE INVENTION

The preferred embodiment of the present invention and its advantages are best understood by referring to FIGS. 1 through 7 of the drawings. Like numerals are used for like and corresponding parts of the various drawings.

MIP Maps

Figure 1:
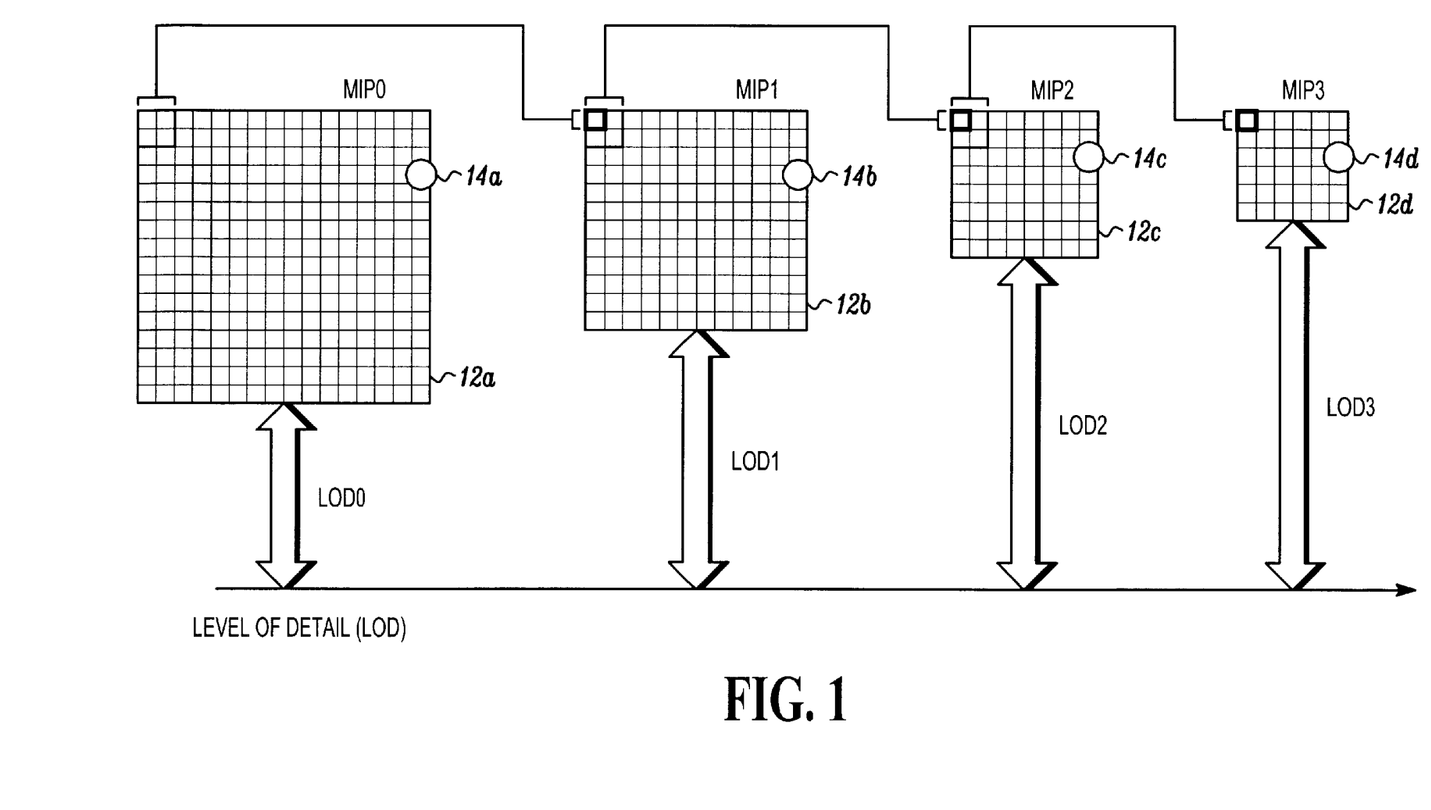
FIG. 1 illustrates a plurality of exemplary MIP maps, each MIP map corresponding to a particular level of detail (LOD)

FIG. 1 illustrates a plurality of exemplary MIP maps 12, separately designated with reference numerals 12a, 12b, 12c, and 12d and labeled as "MIP0," "MIP1," "MIP2," and "MIP3," respectively. MIP maps 12a through 12d can all be associated with the same pattern or texture (not explicitly shown), which can be as simple as stripes and checkered boards, or as complex as wood, stone, sky, fur, hair, scales, and the like. In an imaging technique, each MIP map 12 can be applied to the surface of a polygon like wallpaper to provide the corresponding texture, thereby enhancing the realism of a virtual object formed from such polygon. As such, MIP maps 12 each constitute a texture map.

MIP maps 12a through 12d are organized according to levels of detail (LOD). The level of detail defines how far away a particular object is perceived to be from the viewer of a display. For example, a level of detail "LOD0" may define that an object is to be perceived as being two feet away from a viewer, a level of detail "LOD1" may define that the object is to be perceived as being four feet away, a level of detail "LOD2" may define that the object is to be perceived as being eight feet away, and a level of detail "LOD3" may define that the object is to be perceived as being sixteen feet away. Thus, the levels of detail LOD0, LOD1, LOD2, and LOD3 progress from lower level (where more details should be apparent) to higher level (where less details should be apparent). As shown, MIP0 is defined at level of detail LOD0, MIP1 is defined at level of detail LOD1, MIP2 is defined at level of detail LOD2, and MIP3 is defined at level of detail LOD3.

Each MIP map 12 may comprise an array of texture elements or "texels" 14, which are separately designated for respective MIP maps 12a, 12b, 12c, and 12d by reference numerals 14a, 14b, 14c, and 14d. For clarity, only one each of texels 14a through 14d is labeled in FIG. 1. Each texel 14 can be identified with a set of (u,v) texture coordinates, each of which comprises a u element for defining in a first dimension and a v element for defining in a second dimension.

Each texel 14 may be separately assigned values for a particular gray scale or, alternatively, a color (e.g., red-green-blue (RGB) combination). Texels 14 may also be assigned values for alpha channel, luminance, and the like. Data for the gray scales, color, alpha channels, luminance, etc., constitutes supporting graphics data for texels 14. The gray scale, color, alpha channel, luminance, and the like are such that, if texels 14 are each made relatively small and a sufficiently large number are provided, they collectively create the impression or effect of the desired texture (e.g., stripes, checkerboard, wood, stone, sky, fur, hair, scales, etc.).

As between the various MIP maps 12, an array of texels 14 in a MIP map at a lower level of detail may correspond to, or coincide with, a single texel 14 in a MIP map at a higher level of detail. For example, four texels 14a of MIP0 coincide with a single texel 14b of MIP1. Likewise, four texels 14b of MIP1 coincide with a single texel 14c of MIP2, and four texels 14c of MIP2 coincide with a single texel 14d of MIP3. Because an array of texels provides more detail (e.g., colors, intensities, luminance, etc.) than a single texel, the level of detail is essentially "reduced" when moving from MIP0 to MIP1, from MIP1 to MIP2, and from MIP2 to MIP3.

In operation, any of MIP maps 12a through 12d can be applied to a polygon (e.g., triangle) in order to provide the corresponding texture, thereby enhancing realism of the polygon, and hence, the object formed therefrom. The MIP map 12 which is used depends on the perceived distance for the object of which the polygon is a part. For example, MIP0 may be used if the object should be perceived as being two feet away from the viewer. Likewise, MIP1, MIP2, and MIP3 may be used if the object should be perceived as being four, eight, and sixteen feet away, respectively, from the viewer.

Application of a MIP map 12 to a polygon occurs during the rendering process, in which each pixel of an image screen is assigned a gray scale or color combination value. For any given image screen, if the pixels of the screen do not exactly coincide with the texels of a MIP map 12 to be applied to the particular polygon, such MIP map 12 must be minified or magnified, as described in more detail with reference to FIGS. 2 and 3, respectively.

Minification

Figure 2:
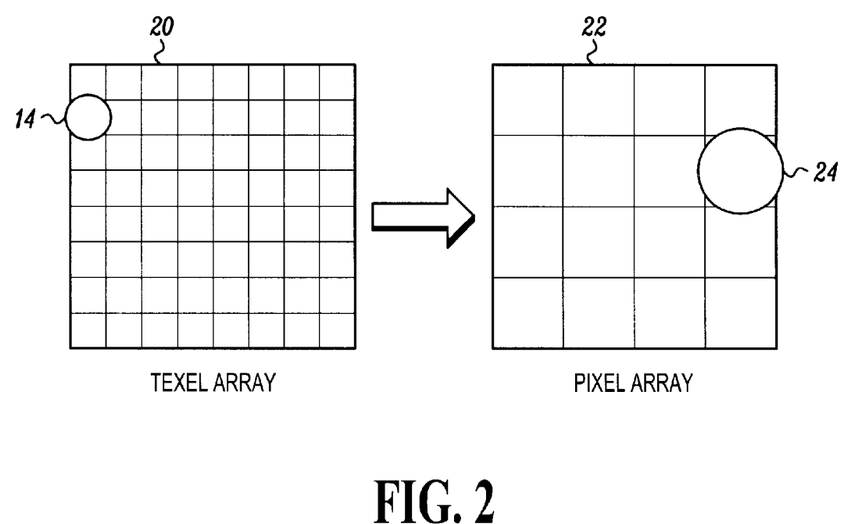
FIG. 2 illustrates the minification of a texel array for application to a pixel array.

FIG. 2 illustrates an exemplary case where a minification technique may be used to "fit" a texel array 20 to a pixel array 22. Texel array 20 comprises a number of texels 14, and pixel array 22 comprises a number of pixels 24. For clarity, only one each of texels 14 and pixels 24 is labeled in FIG. 2.

Each texel 14 has its own color or gray scale value and, as shown, is smaller than a single pixel 24. Each pixel 24 can only be assigned a single color/gray scale value. Accordingly, not every color/gray scale of the set of texels 14 can be translated to a separate pixel 24. Thus, the number of texels 14 must be reduced or "minified" when rendering into pixels 24. This correspondingly "minifies" the detail (e.g., gray scales or color combinations) provided by texel array 20.

Magnification

Figure 3:
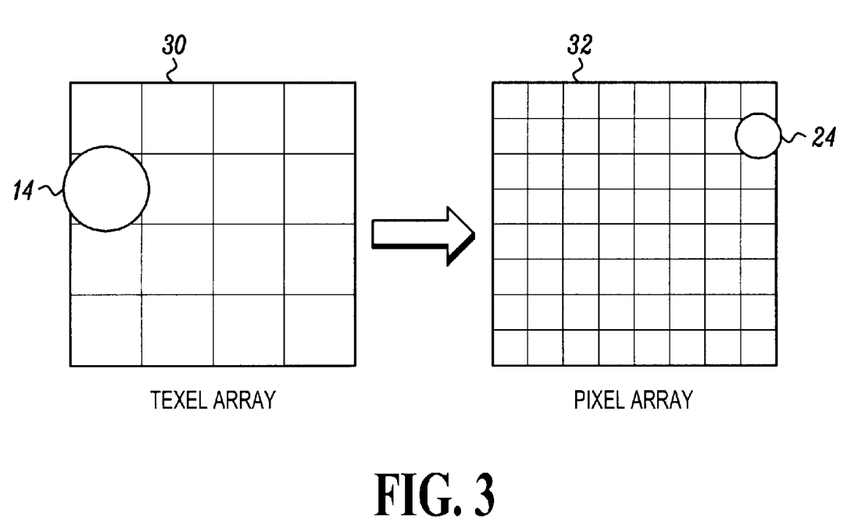
FIG. 3 illustrates the magnification of a texel array for application to a pixel array.

FIG. 3 illustrates an exemplary case where a magnification technique may be used to "fit" a texel array 30 to a pixel array 32. Texel array 30 comprises a number of texels 14, and pixel array 32 comprises a number of pixels 24. For clarity, only one each of texels 14 and pixels 24 is labeled in FIG. 3.

Each texel 14 has its own color/gray scale and, as shown, is larger than a single pixel 24. Each pixel 24 must be assigned its own separate color or gray scale value, but the set of texels 14 in texel array 30 is not sufficient to provide this. Accordingly, the number of texels 14 must be increased or "magnified" when rendering into pixels 24. This correspondingly "magnifies" the detail (e.g., gray scales or color combinations) provided by texel array 30.

Interpolation (In General)

Figure 4:
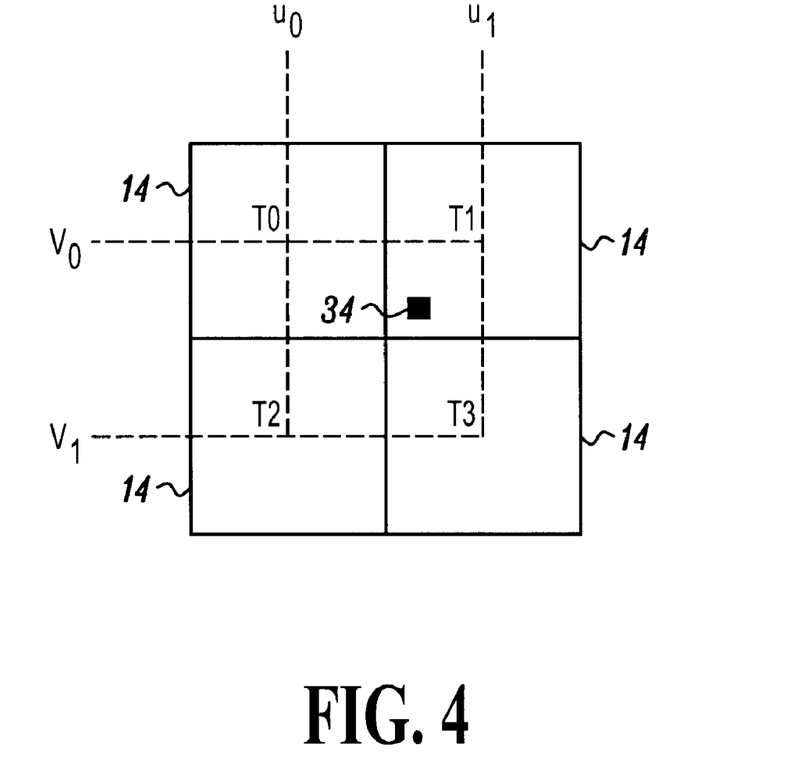
FIG. 4 illustrates the association of a sample point to a number of texels in a bilinear sampling technique.

A technique of interpolation can be used when minifying or magnifying an array of texels 14 during the rendering process. For interpolation, as illustrated in FIG. 4, a sample point 34—which may represent or correspond to a pixel—can be associated with a number of texels 14 (separately labeled as "T0," "T1," "T2," and "T3") of a MIP map 12. As depicted, these texels 14 are arranged in a 2×2 array.

Each of texels 14 can be identified by a respective set of (u,v) texture coordinates. Because texels 14 are arranged in a 2×2 array, two each of the respective sets of coordinates have the same u element for the first dimension, and two each of the respective sets have the same v element for the second dimension. In particular, the coordinate sets for texels T0 and T1 have the same "$v_0$" coordinate, the coordinate sets for texels T2 and T3 have the same "$v_1$" coordinate, the coordinate sets for texels T0 and T2 have the same "$u_0$" coordinate, and the coordinate sets for texels T1 and T3 have the same "$u_1$" coordinate.

As an illustrative example, sample point 34 may have the coordinates (38.7, 51.8), and texels T0, T1, T2, and T3 may have the coordinates (38, 52), (39, 52), (38, 51), and (39, 51), respectively. Texels T0 and T1 have the same v coordinate of "52", texels T2 and T3 have the same v coordinate of "51", texels T0 and T2 have the same u coordinate of "38", and texels T1 and T3 have the same u coordinate of "39".

Each of texels T0 through T3 has its own gray scale or color, which can be the same or different from the gray scales or colors of the other texels in the array. In general, sample point 34 (and hence, the represented or corresponding pixel) is defined relative to the nearest texels 14 in MIP map 12. Accordingly, the gray scale or color for sample point 34 is derived from the gray scales or colors of texels T0 through T3. This can be accomplished by assigning a certain weight to each of these texels 14 based upon proximity to sample point 34, and interpolating between the gray scales or colors of all of the texels 14 using the respective weights to yield a gray scale or color for sample point 34.

In general, a bilinear interpolation operation, which can be used for sample point 34 and select pairs of texels T0 through T3—i.e., texels T0 and T1; texels T2 and T3; texels T0 and T2; and texels T1 and T3—is given by the following equation:

$$I = a(1-w) + bw \quad (1)$$

where a is a numerical value representing the color/gray scale of one texel of each pair, b is a numerical value representing the color/gray scale of the other texel of each pair, w is the weighting value for b (where w can have a value between 0 and 1, inclusively), (1−w) is the weighting value for a, and I is the interpolation result representing a color/gray scale.

As between the two texels of each pair, each weighting value defines the amount of weight to be given to the color/gray scale of the respective texel. The sum of the weighting values for each pair of texels equals "one" —i.e., w+(1−w)=1. As such, a single variable defines the weighting relationship between the two texels (or pair of texels) of a pair. This can be reflected in equation (1) by re-arranging the equation as follows:

$$I = a + (b-a)w \quad (2)$$

so that the weighting value w is applied to the difference of a and b.

Each weighting value is a vector quantity having magnitude and direction. Thus, a separate weighting value may be given for each of the two dimensions (i.e., u and v). In particular, a first (u) weighting value may be provided for the u dimension, and a second (v) weighting value may be provided for the v dimension. In one embodiment, yet another weighting value may be provided for a third dimension (i.e., "depth" or d); that is, a third (d) weighting value may be provided for the d dimension. The addition of the third weighting value supports trilinear operation for deriving a gray scale or color for sample point 34 based on the gray scales/colors, and respective weighting values, of the surrounding texels 14. Each weighting value for a texel (or pair of texels) can be represented by a respective multi-bit data word (described below).

Texel Weighting Word

Figure 5A:
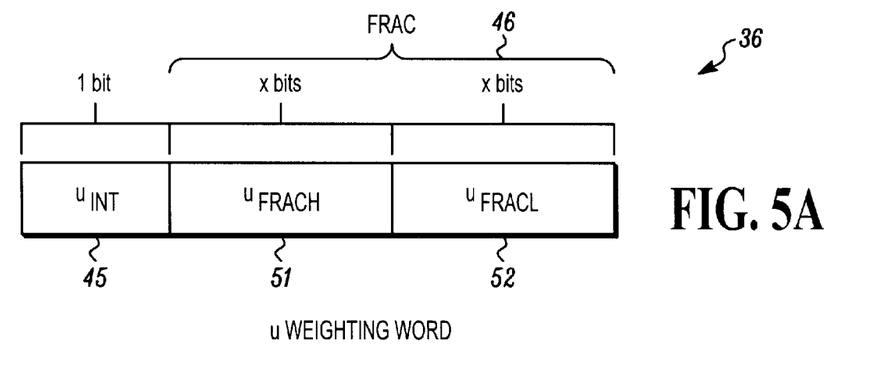
FIGS. 5A, 5B, and 5C illustrate exemplary multi-bit texel weighting words.
Figure 5B:
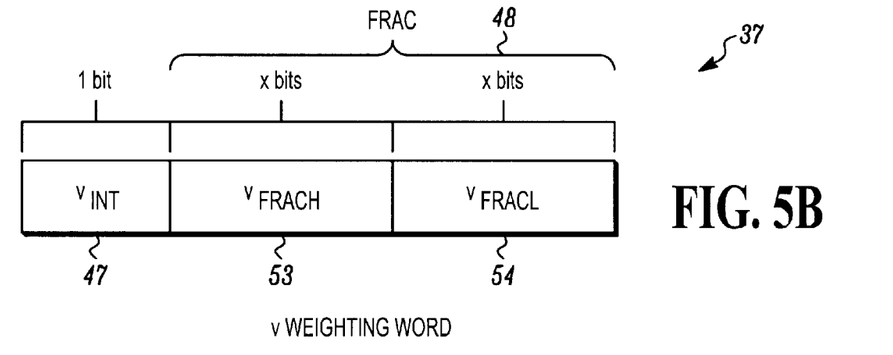
Figure 5C:
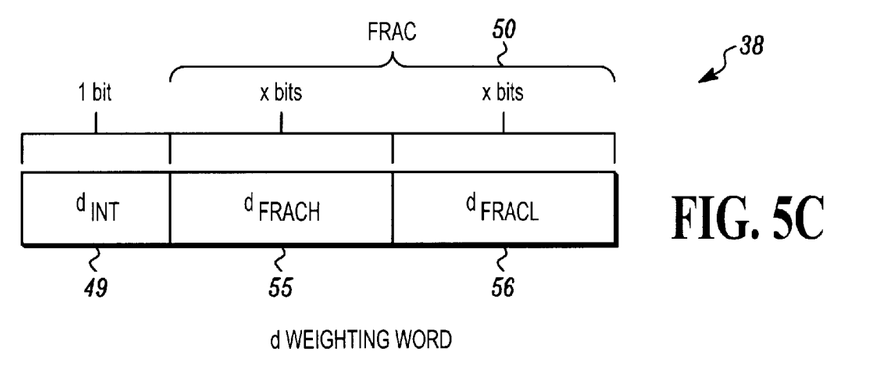

FIGS. 5A through 5C illustrate multi-bit data words 36, 37, and 38 for texel weighting values in the u, v, and d dimensions, respectively.

Each texel weighting word 36, 37, and 38 comprises a sequence of bits. One portion of each sequence corresponds to an integer (INT) component, and another portion corresponds to a fraction (FRAC) component. In particular, u weighting word 36 comprises an integer ($u_{INT}$) component 45 and a fraction ($u_{FRAC}$) component 46; v weighting word 37 comprises an integer ($v_{INT}$) component 47 and a fraction ($v_{FRAC}$) component 48; and d weighting word 38 comprises an integer ($d_{INT}$) component 49 and a fraction ($d_{FRAC}$) component 50.

Each integer (INT) component ($u_{INT}$ component 45, $v_{INT}$ component 47, and $d_{INT}$ component 49) can be one or more bits representing an integer—i.e., a number on the left side of a decimal point. As depicted, each of the integer (INT) components comprises one bit. The value of each of these integer (INT) components can be "1" or "0."

Each fraction (FRAC) component ($u_{FRAC}$ component 46, $v_{FRAC}$ component 48, and $d_{FRAC}$ component 50) can be one or more bits representing a fraction—i.e., a number on the right side of a decimal point. Each fraction (FRAC) component may have a "fraction high" (FRACH) portion and a "fraction low" (FRACL) portion. In each fraction (FRAC) component, the fraction high (FRACH) portion is provided for numbers having greater magnitude (i.e., closer to the decimal point), and the fraction low (FRACL) portion is provided for numbers having smaller magnitude (i.e., further away from the decimal point). As depicted, $u_{FRAC}$ component 46 comprises a $u_{FRACH}$ portion 51 and a $u_{FRACL}$ portion 52; $v_{FRAC}$ component 48 comprises a $v_{FRACH}$ portion 53 and a $v_{FRACL}$ portion 54; and $d_{FRAC}$ component 50 comprises a $d_{FRACH}$ portion 55 and a $d_{FRACL}$ portion 56. Each of $u_{FRACH}$ portion 51, $u_{FRACL}$ portion 52, $v_{FRACH}$ portion 53, $v_{FRACL}$ portion 54, $d_{FRACH}$ portion 55, and $d_{FRACL}$ portion 56 may comprise x (e.g., eight) bits.

The integer (INT) component in combination with the fraction high (FRACH) portion of each weighting word constitutes a "weight high" component. Thus, for u weighting word 36, a u weight high component includes $u_{INT}$ component 45 and $u_{FRACH}$ portion 51. For v weighting word 37, a v weight high component includes $v_{INT}$ component 47 and $v_{FRACH}$ portion 53. For d weighting word 38, a d weight high component includes $d_{INT}$ component 49 and $d_{FRACH}$ portion 55.

The fraction low (FRACL) portion of each weighting word can be combined with a separate, respective integer component (not shown) to form a "weight low" component. The value for the integer components in each weight low component is "0." Thus, for u weighting word 36, a u weight low component includes a zero-value integer component and $u_{FRACL}$ portion 52. For v weighting word 37, a v weight low component includes a zero-value integer component and $v_{FRACL}$ portion 54. For d weighting word 38, a d weight low component includes a zero-value integer component and $d_{FRACL}$ portion 56.

Multi-bit weighting words—such as texel weighting words 36, 37, and 38—can be used in a typical circuit for performing trilinear interpolation. Such trilinear interpolation circuit performs multiple bilinear interpolation operations (of the sort of equation (2) above) to derive a gray scale or color for a sample point 34 based on the gray scales/colors of the surrounding texels 14. As described below, the typical circuit operates only upon the weight high component (comprising the integer component and fraction high portion), but not the weight low component (having the fraction low portion) of the respective texel weighting words.

Trilinear Interpolation Circuit

Figure 6:
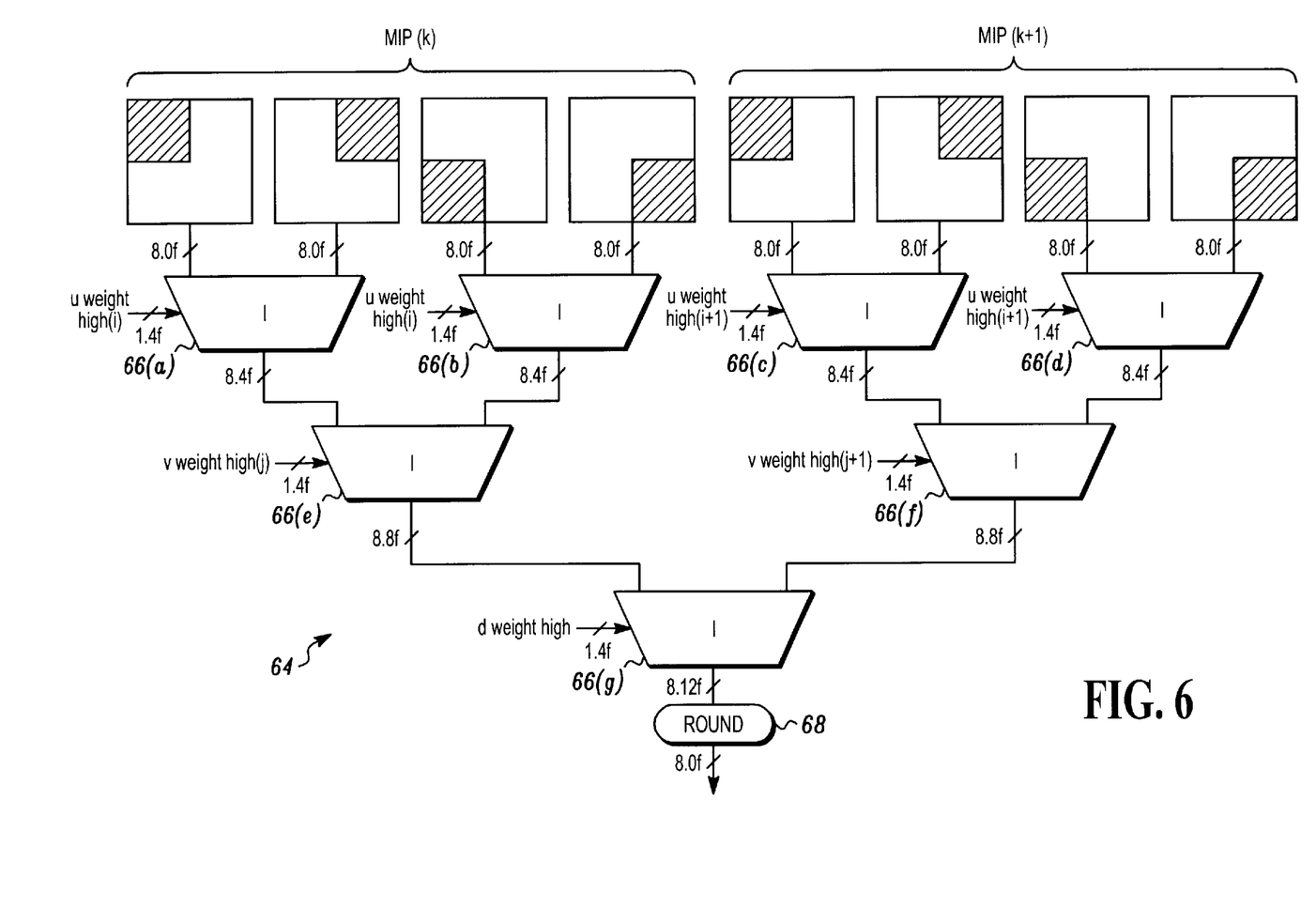
FIG. 6 is a schematic diagram for a typical circuit implementation for performing a trilinear interpolation operation.

FIG. 6 illustrates a circuit 64 which is typical of the type of circuit used for implementing a trilinear interpolation operation. With trilinear interpolation, the gray scale or color for a pixel is derived using sample points in representative texel arrays (e.g., 2×2 array of texels) for each of two MIP maps. More specifically, the MIP maps—referred to generally as "MIP(k)" and "MIP(k+1)" —are each defined for a respective level of detail. The pixel corresponds to a point that is at a level of detail in between the levels of detail for MIP(k) and MIP(k+1). The ultimate result of circuit 64 is to provide a color or gray scale for the pixel.

To accomplish this, circuit 64 performs a number of bilinear operations. In particular, at least one bilinear interpolation is performed for the texel arrays of each of MIP(k) and MIP(k+1) to derive a color or gray scale value for each of the respective sample points. A final linear interpolation is performed to derive a color or gray scale for the pixel which corresponds to a point that is at a level of detail in between the levels of detail for MIP(k) and MIP(k+1).

As shown, each texel array comprises four texels, each texel having a respective color or gray scale. These texels are selected because of close proximity to respective sample points (such as that described with reference to FIG. 4) on MIP(k) and MIP(k+1). The sample points in each MIP map coincide with the location of the pixel if such MIP map was to be used exclusively (i.e., without regard to level of detail).

Circuit 64 comprises a number of interpolation operators 66—separately labeled as 66(*a*), 66(*b*), 66(*c*), 66(*d*), 66(*e*), 66(*f*), and 66(*g*). These interpolation operators 66 each function to perform an interpolation operation given by the following equation:

$$I_4(a,b,w) = a + (b-a)w \quad (3)$$

where a and b are operands, each representing a color or gray scale for a respective texel; w is a weighting value having only a weight high component (u weight high, v weight high, or d weight high (see FIG. 5)); and $I_4(a,b,f)$ is the interpolation result, which represents a color or gray scale. Assuming that a complete sequence for a weighting value comprises eight bits in the fraction component, the subscript "4" indicates that only four out of the eight fraction bits are used to derive the interpolation result.

Each of the operands (a and b) and the weighting values (w) operated upon by interpolation operators 66 are generally formatted as a sequence of (N+M) bits in the form of "N.Mf." For each sequence, "N" is the number of bits corresponding to the integer component (on the left side of a decimal point) and "M" is the number of bits corresponding to the fraction component (on the right side of a decimal point). A sequence of bits for the "N.Mf" form appears as follows:

```
... ###.## ... #####
 N bits       M bits
```

The actual values for "N" and "M" for the operands and weighting values differ, as further described below.

As depicted, interpolation operator 66(*a*) operates on operands corresponding to the two "upper" texels of the array for MIP(k) using a first u weight high component (i.e., u weight high (i)); interpolation operator 66(*b*) operates on the two "lower" texels of the array for MIP(k) using the same u weight high (i) component. Interpolation operator 66(*c*) operates on the two "upper" texels of the array for MIP(k+1) using a second u weight high component (i.e., u weight (i+1)); and interpolation operator 66(*d*) operates on the two "lower" texels of the array for MIP(k+1) using the u weight high (i+1) component. Each of the u weight high (i) component and the u weight high (i+1) component comprises a five-bit sequence in the form of "1.4f," thus having one bit on the left side of the decimal point (i.e., integer) and four bits on the right side of the decimal point (i.e., fraction). The operands for interpolation operators 66(*a*) through 66(*d*), which represent various texels, each comprise an eight-bit sequence in the form of "8.0f," thus having eight integer bits on the left side of the decimal point and no fraction bits on the right side of the decimal point. Each of interpolation operators 66(*a*) through 66(*d*) generates a result representing a color or gray scale for a hypothetical texel between the respective texels operated upon. Each result comprises a twelve-bit sequence in the form of "8.4f," thus having eight integer bits and four fraction bits.

Interpolation operator 66(*e*) receives the results of interpolation operators 66(*a*) and 66(*b*) as operands, and operates on them using a first v weight high component (i.e., v weight high (j)). Interpolation operator 66(*f*) receives the results of interpolation operators 66(*c*) and 66(*d*), and operates on them using a second v weight high component (i.e., v weight high (j+1)). Each of v weight high (j) component and v weight high (j+1) component comprises a five-bit sequence in the form of "1.4f," thus having one integer bit and four fraction bits. Interpolation operators 66(*e*) and 66(*f*) each generate a result representing a color or gray scale for the sample point of the respective array of texels (for MIP(k) and MIP(k+1), respectively). These results from interpolation operators 66(*e*) and 66(*f*) each comprise a sixteen-bit sequence in the form of "8.8f," thus having eight integer bits and eight fraction bits.

Interpolation operator 66(*g*) receives the results of interpolation operators 66(*e*) and 66(*f*), and operates on them using a d weight high component. The d weight high component comprises a five-bit sequence in the form of "1.4f," thus having one integer bit and four fraction bits.

A rounding operator 68 receives the result of interpolation operator 66(*g*) as input. Rounding operator 68 rounds off the result to, for example, an eight-bit sequence in the form of "8.0f." Alternatively, rounding operator 68 may simple truncate the fraction portion (comprising the last eight bits) of the sixteen-bit sequence output by interpolation operator 66(*g*). The eight-bit result from rounding operator 68 represents a color or gray scale for the pixel which corresponds to a point that is at a level of detail in between the levels of detail for MIP(k) and MIP(k+1). In another embodiment, one or more rounding operations can be performed between steps of interpolation, rather than at the end.

Interpolation operators 66 are supported by a number of buses. The number of bits carried by each bus is proportionate to that of the operands and weighting values input/output by the supported interpolation operators 66.

It should be noted that in circuit 64, interpolation operators 66(*a*) through 66(*f*) of circuit 64 do not utilize entire weighting values. For example, a full weighting value may take the form of "1.8f" where four of the eight fraction bits is for the fraction high (FRACH) portion, and the other four of the eight fraction bits is for the fraction low (FRACL) portion (see FIG. 5). Because each of the u weight high (i) component, the u weight high (i+1) component, the v weight high (j) component, the v weight high (j+1) component, and the d weight high component only comprises a respective weight high component, the corresponding fraction low (FRACL) portions are not used.

According to the present invention, a circuit for creating more detail from a single MIP map 12 can be implemented using many of the same elements typically used in the circuit 64 for performing trilinear interpolation. Such high-precision bilinear interpolation circuit uses the entire weighting value (as opposed to only the weight high component), thereby providing more detail. This is explained below.

High-Precision Bilinear Interpolation

Figure 7:
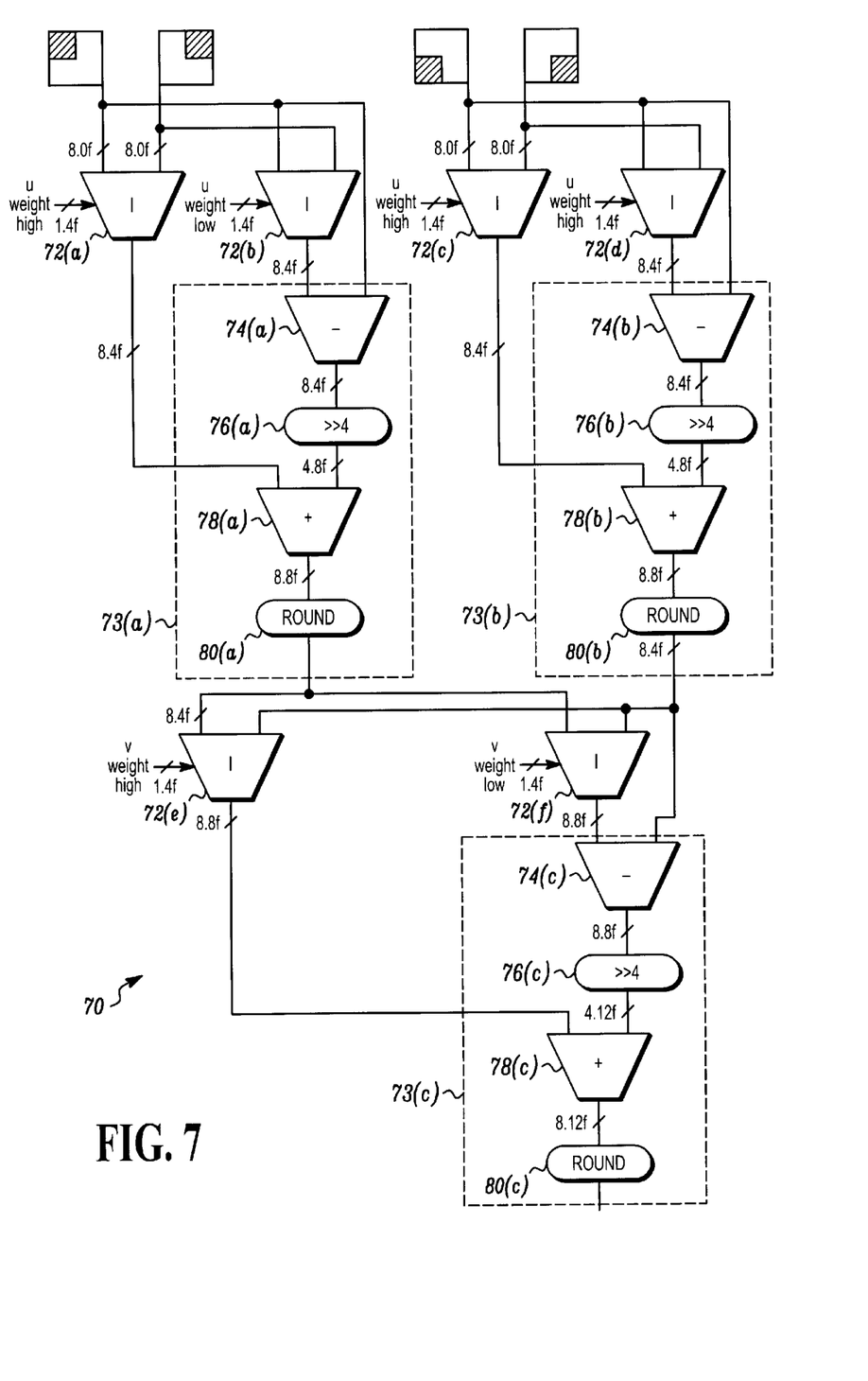
FIG. 7 is a schematic diagram for a high-precision bilinear interpolation circuit, according to an embodiment of the present invention.

FIG. 7 illustrates an exemplary circuit 70, in accordance with an embodiment of the present invention.

Circuit 70 implements a high-precision bilinear interpolation operation which provides additional detail for a texel array of a MIP map 12. This can be accomplished using essentially the hardware (e.g., gates and other operators) which is available for the typical trilinear interpolation circuit 64 described above with reference to FIG. 6.

Referring to FIG. 7, high-precision bilinear interpolation circuit 70 includes a number of interpolation operators 72 and a number of combination operators 73. Interpolation operators 72—separately labeled as 72(a), 72(b), 72(c), 72(d), 72(e), and 72(f)—are grouped into pairs. As shown, these pairs are as follows: interpolation operators 72(a) and 72(b), interpolation operators 72(c) and 72(d), and interpolation operators 72(e) and 72(f). Interpolation operators 72 are substantially similar to interpolation operators 66 of trilinear interpolation circuit 64 (FIG. 6).

Combination operators 73—separately labeled as 73(a), 73(b), and 73(c)—are each associated with a respective pair of interpolation operators 72. In particular, combination operator 73(a) is associated with interpolation operators 72(a) and 72(b); combination operator 73(b) is associated with interpolation operators 72(c) and 72(d); and combination operator 73(c) is associated with interpolation operators 72(e) and 72(f). Each combination operator 73 generally functions to combine the results output by the respective interpolation operators 72 along with a third term, this third term being one of the inputs into the respective interpolation operators. This is discussed below in more detail. As depicted, each combination operator 73 includes a subtractor 74 (separately labeled as 74(a), 74(b), or 74(c)), a shifter 76 (separately labeled as 76(a), 76(b), or 76(c)), an adder 78 (separately labeled as 78(a), 78(b), or 78(c)), and a rounding operator 80 (separately labeled as 80(a), 80(b), or 80(c)). In other embodiments of the present invention, combination operators 73 can be implemented differently from that depicted in FIG. 7.

Each grouping—comprising a pair of interpolation operators 72 and a combination operator 73—functions to perform an interpolation operation generally given by the following equation:

$$I_8(a,b,W) = a + (b-a)W \quad (4)$$

where a and b are operands, each representing a color or gray scale for a respective texel; W is a weighting value having both a weight high component and a weight low component; and $I_8(a,b,W)$ is the interpolation result, which can be representative of a color or gray scale.

For a multi-bit texel weighting word comprising a nine-bit sequence, an equation for the weighting value is as follows:

$$W = w_{HI} + w_{LO}/16 \quad (5)$$

where $W_{HI}$ corresponds to the weight high component and $W_{LO}$ corresponds to the weight low component.

Using equation (5), equation (4) for a grouping (comprising a pair of interpolation operators 72 and a combination operator 73) can be manipulated as follows:

$$\begin{aligned}
I_8(a, b, W) &= a + (b-a)W \quad (6)\\
&= a + (b-a)\left(w_{HI} + \frac{w_{LO}}{16}\right)\\
&= a + (b-a)w_{HI} + (b-a)\frac{w_{LO}}{16}\\
&= [a + (b-a)w_{HI}] + \frac{[a + (b-a)w_{LO}] - a}{16}\\
&= I_4(a, b, w_{HI}) + \frac{I_4(a, b, w_{LO}) - a}{16}
\end{aligned}$$

Referring to FIG. 7, the pair of interpolation operators 72(a) and 72(b) operate on operands corresponding to the two "upper" texels of the array for a MIP map 12. Interpolation operator 72(a) receives a u weight high component; interpolation operator 72(b) receives a u weight low component. Each of u weight high and u weight low components comprises a five-bit sequence in the form of "1.4f," thus having one integer bit and four fraction bits. The pair of interpolation operators 72(c) and 72(d) operate on the two "lower" texels of the array for the MIP map. Interpolation operator 72(c) receives the u weight high component; interpolation operator 72(d) receives the u weight low component.

The operands for interpolation operators 72(a) through 72(d) each comprise an eight-bit sequence in the form of "8.0f," thus having eight integer bits and no fraction bits. Each of interpolation operators 72(a) through 72(d) generates a result representing a color or gray scale for a hypothetical texel between the respective texels operated upon. Each result comprises a twelve-bit sequence in the form of "8.4f," thus having eight integer bits and four fraction bits. For each pair of interpolation operators 72, the result of one operator corresponds to the term $I_4(a,b,w_{HI})$ in equation (6), while the result of the other operator corresponds to the term $I_4(a,b,w_{LO})$.

Combination operator 73(a) operates on the results of the pair of interpolation operators 72(a) and 72(b) and also one of the operands representing an upper texel of the relevant array. In particular, subtractor 74(a) receives the result from interpolation operator 72(b) and the operand. Subtractor 74(a) functions to output a result representing the term 14 $(a,b,w_{LO})$—a in equation (6). This result comprises a twelve-bit sequence in the form of "8.4f," thus having eight integer bits and four fraction bits.

Shifter 76(a) shifts the subtraction result of subtractor 74(a) by a predetermined number (e.g., four) of decimal spaces. Shifter 76(a) outputs a result representing the term $[I_4(a,b,w_{LO})-a]/16$ in equation (6). This output result comprises a twelve-bit sequence in the form of "4.8f," which has four integer bits and eight fraction bits.

Adder 78(a) receives the results from interpolation operator 72(a) and shifter 76(a). Adder 78(a) functions to add together the received results to generate a respective sixteen-bit sequence in the form of "8.8f," which has eight integer bits and eight fraction bits. The sixteen-bit sequences output by adder 78(a) represents the entire right side of equation (6), or $I_4(a,b,w_{HI})+[I_4(a,b,w_{LO})-a]/16$, where a and b correspond to the two "upper" texels of the array for a MIP map 12.

A rounding operator 80(a) receives the result of adder 78(a) as input. Rounding operator 80(a) rounds off the received result to, for example, a twelve-bit sequence in the form of "8.4f." Alternatively, rounding operator 80(a) may simply truncate four bits of the fraction portion of the received result.

In a like manner, combination operator 73(b) operates on the results of the pair of interpolation operators 72(c) and 72(d), and one of the operands representing a lower texel of the relevant array. Thus, combination operator 73(b) outputs a result which is a rounded representation of $I_4(a,b,w_{HI})+ [I_4(a,b,w_{LO})-a]/16$, where a and b correspond to the two "lower" texels of the array for a MIP map 12.

Interpolation operators 72(e) and 72(f) both receive the outputs of combination operators 73(a) and 73(b) as operands, and operate on them using the v weight high component and the v weight low components, respectively. These v weight high and v weight low components each comprise a five-bit sequence in the form of "1.4f," thus having one integer bit and four fraction bits. Each of interpolation operators 72(e) and 72(f) generates a result comprising a sixteen-bit sequence in the form of "8.8f," thus having eight integer bits and eight fraction bits.

Combination operator 73(c) receives the results of the pair of interpolation operators 72(e) and 72(f) and the output of combination operator 73(b). Combination operator 73(c) operates in a substantially similar manner to combination operators 73(a) and 73(b). Combination operator 73(c) outputs a result comprising an eight-bit sequence in the form of "8.0f." This result also constitutes the output of high-precision bilinear interpolation circuit 70.

Because high-precision bilinear interpolation circuit 70 utilizes the entire fraction component of a weighting value (i.e., both the fraction high (FRACH) and the fraction low (FRACL) portions), as opposed to only one portion (e.g., FRACH portion), the eight-bit sequence output by high-precision bilinear interpolation circuit 70 is more accurate and provides more detail. Furthermore, because interpolation operators 72(a) through 72(f) of high-precision bilinear interpolation circuit 70 can be substantially similar to interpolation operators 66(a) through 66(f) of circuit 64 (FIG. 6), high-precision bilinear interpolation circuit 70 can readily be implemented using the hardware which is available to implement a trilinear operation in a typical circuit. Thus, a technical advantage of the present invention includes implementing a high-precision bilinear interpolation operation utilizing essentially the hardware required for two low-precision, bilinear interpolation operations. In this way, a more accurate interpolation is given without substantially modifying hardware that is readily available.

Although the present invention and its advantages have been described in detail, it should be understood that various changes, substitutions, and alterations can be made therein without departing from the spirit and scope of the invention as defined by the appended claims.

What is claimed is:

1. A circuit for performing a high-precision bilinear interpolation operation, the circuit comprising:

a first interpolation operator operable to interpolate two operands representing a pair of texels using a weight high component of a weighting value, the first interpolation operator operable to output a first result;

a second interpolation operator operable to interpolate the two operands representing the pair of texels using a weight low component of the weighting value, the second interpolation operator operable to output a second result; and a combination operator coupled to the first and second interpolation operators, the combination operator operable to combine the first and second results, thereby performing a high-precision linear operation.

2. The circuit of claim 1 wherein the combination operator comprises a subtractor operable to subtract one of the two operands representing a pair of texels from the second result.

3. The circuit of claim 2 wherein the combination operator comprises an adder coupled to the subtractor, the adder operable to add the first result to an output of the subtractor.

4. A circuit for performing a high-precision bilinear interpolation operation, the circuit comprising:

a first pair of interpolation operators, one interpolation operator of the first pair operable to interpolate two operands representing a first pair of texels using a weight high component of a first weighting value, the other interpolation operator of the first pair operable to interpolate the two operands representing the first pair of texels using a weight low component of the first weighting value, each interpolation operator of the first pair operable to output a result;

a first combination operator coupled to the first pair of interpolation operators, the first combination operator operable to combine the results output by the first pair of interpolation operators;

a second pair of interpolation operators, one interpolation operator of the second pair operable to interpolate two operands representing a second pair of texels using the weight high component of the first weighting value, the other interpolation operator of the second pair operable to interpolate the two operands representing the second pair of texels using the weight low component of the first weighting value; and a second combination operator coupled to the second pair of interpolation operators, the second combination operator operable to combine the results output by the second pair of interpolation operators.

5. The circuit of claim 4 further comprising a third pair of interpolation operators coupled to the first and second combination operators, one interpolation operator of the third pair operable to interpolate outputs of the first and second combination operators using a weight high component of a second weighting value, the other interpolation operator of the third pair operable to interpolate the outputs of the first and second combination operators using a weight low component of the second weighting value, each interpolation operator of the third pair operable to output a result.

6. The circuit of claim 5 comprising a third combination operator coupled to the third pair of interpolation operators, the third combination operator operable to combine the results output by the third pair of interpolation operators.

7. The circuit of claim 4 wherein each of the first and second combination operators comprises a subtractor operable to subtract one of the two respective operands from one of the results output by the respective pair of interpolation operators.

8. The circuit of claim 7 wherein each of the first and second combination operators comprises an adder coupled to the respective subtractor, the adder operable to add one of the results output by the respective pair of interpolation operators to an output of the respective subtractor.

* * * * *